Patented Mar. 7, 1944

2,343,835

UNITED STATES PATENT OFFICE 2,343,835

METHOD OF COMPOUNDING RUBBER

Claude H. Smith, Talmadge, and Albert J. Gracia, Cuyahoga Falls, Ohio, assignors to Wingfoot Corporation, Akron, Ohio, a corporation of Delaware No Drawing. Application February 8, 1939, Serial No. 255,294

10 Claims. (Cl. 260—752)

This invention relates to a method of compounding rubber and more particularly, to a method of treating a certain type of rubber compounding material whereby the incorporation of this material into rubber is facilitated according to some processes and made possible according to other processes. By the practice of the invention the material is rendered eminently suitable for use in rubber compounding.

In preparing rubber for practical application and commercial use, it is customary and ordinarily necessary to add various materials to the rubber, all of which modify the properties of the rubber to a greater or lesser degree. These added materials include pigments, fillers, vulcanizing agents, accelerators and age resisters. One of the most widely used types of accelerators is the di(arylenethiazyl) disulfides of which di(benzothiazyl) disulfide is a leading example. These materials may be prepared by a variety of well known methods which vary in detail and in result. Some of these methods yield products which are readily applicable to use in rubber compounding and offer no particular difficulties when so applied. Others produce products which, although chemically suitable, are difficult of application to rubber compounding and under certain conditions behave so poorly as to be commercially impractical.

Several of the methods of preparing di(arylenethiazyl) disulfides produce the material by oxidizing the corresponding mercaptoarylenethiazole by means of nitrous acid, as in the process described in U. S. Patent 1,908,935. According to this process, the mercaptoarylenethiazole is treated with a nitrite and an acid, the latter serving to liberate nitrous acid from the nitrite and the two being added in amount less than that sufficient to oxidize the mercaptoarylenethiazole to the corresponding di(arylenethiazyl) disulfide, and air is blown into the mixture to assist in the oxidation. Another related process is described in U. S. Patent No. 2,119,131 in which the mercaptoarylenethiazole is oxidized to the di(arylenethiazyl) disulfide by the use of at least the full oxidizing requirement of a nitrite and an acid substance which serves to liberate nitrous acid. In these processes the nitrous acid, or the nitrogen oxides released therefrom, is an economical oxidizing agent and the processes consequently effect certain savings in costs. However, it has been found that processes such as these, in which the mercaptoarylenethiazole is oxidized by means of nitrous acid, tend to produce the di(arylenethiazyl) disulfide in a form which is difficultly dispersible in rubber according to some methods and which, according to other methods, is impossible of satisfactory dispersion. For example, such products customarily contain large quantities of aggregated di(arylenethiazyl) disulfide in which the ultimate small particles of the material are cemented together to form aggregates which are much too large for use in rubber compounding. Moreover, these aggregates are hard and firmly bound together and are not readily reduced to satisfactory particle size. Thus, when such material is added to rubber according to the widely used process in which the rubber is mechanically worked with the compounding ingredient on a rubber mill, prolonged times of milling and excessive amounts of energy are consumed in dispersing the di(arylenethiazyl) disulfide throughout the rubber and even then it is difficult if not impossible to obtain entirely satisfactory dispersion, the product customarily still containing some unbroken aggregates. These aggregates are obviously undesirable in the compounded rubber since they reduce the smoothness and homogeneity of the stock and on the subsequent vulcanization produce localized inequalities in the cure. When such aggregated di(arylenethiazyl) disulfides are worked with rubber in an internal type mixer such as a Banbury, the difficulties encountered are greatly magnified and it is practically impossible to secure suitable dispersion of the material in the rubber. Thus, although di(arylenethiazyl) disulfides prepared by the use of nitrous acid may involve lower costs for oxidizing agent, the products obtained are not readily applicable to use in rubber compounding.

According to the present invention, a method has been discovered whereby the aggregates of di(arylenethiazyl) disulfides prepared by oxidizing mercaptoarylenethiazoles by means of nitrous acid, or its equivalent, are rendered suitable for use in rubber compounding so that, when used in the usual rubber compounding procedures, the material handles well without undue expenditure of time and energy while securing excellent dispersions of disaggregated ultimate particles of the di(arylenethiazyl) disulfide.

According to the invention, the aggregates of di(arylenethiazyl) disulfide are treated with an oily material, such as a mineral or vegetable oil, which not only serves as a dispersing agent but also promotes disaggregation of the material so that, on subsequent mechanical working with rubber, the aggregates are reduced to the individual particles of the di(arylenethiazyl) disulfide and these particles are dispersed throughout the rubber. Suitable oily materials are mineral oil, cottonseed oil, pine oil, cocoanut oil, oleic acid, ammonium oleate, stearic acid, lauric acid, castor oil, paraffin, and the like.

Any of the foregoing or other oily materials, or a mixture thereof, is applied to the aggregated di(arylenethiazyl) disulfide by any suitable procedure. For example, it may be added to a slurry of the aggregates, from which it is absorbed or adsorbed on the surface of the aggregates or it may be sprayed or fumed onto the aggregates. The oily materials may be applied as such or they may be added in the form of salts or soaps from which they are later precipitated by means of an acid, for example, by the addition of sodium stearate to a slurry of the aggregates in water and subsequent acidification of the slurry. Also, they may be added in the form of ammonium salts from which the desired material is subsequently recovered by heating the coated aggregates to decompose the salt and drive off the ammonia. If the oily materials are added as such to a slurry of the aggregates they are preferably emulsified to obtain uniform mixing, although in some cases satisfactory dispersion can be obtained by merely stirring the oily material into the slurry. Normally solid materials such as paraffin and other waxes should be melted.

The following example, in which di(benzothiazyl) disulfide was coated with mineral oil, will serve to illustrate the practice of the invention. Five hundred pounds of 2-mercaptobenzothiazole of approximately 90% purity was prepared according to the process of U. S. Patent 1,631,871 to Kelly. The molten product was discharged into 950 gallons of water, with vigorous agitation, heated to 80° C. The agitation was stopped and the pellets formed were allowed to settle. The supernatant liquor was then decanted off and 950 gallons of water were added. Seventeen gallons of 48% caustic solution were then slowly added (this being slightly less than the theoretical amount required to dissolve the mercaptobenzothiazole) and the mixture was agitated for one hour at 40° C. The undissolved impurities were then settled out of the solution of sodium mercaptobenzothiazole and the solution was then run into dilute sulfuric acid, prepared by adding 81 pounds of 95% sulfuric acid to 300 gallons of city water, until the mixture was neutral or slightly acid to litmus, maintaining effective agitation throughout the addition. To the slurry of precipitated 2-mercaptobenzothiazole thus obtained was added the chemical equivalent of sodium nitrite plus a 5% excess (about 110 pounds in all). The mixture was then heated to 90–95° C. and a 5–10% solution of sulfuric acid was run in at a rate sufficient to cause the foam formed to rise within three or four inches of the top of the tank and to cause a small amount of brown fumes (nitrogen oxide) to appear in the vapors arising from the slurry, the mix being constantly stirred throughout the oxidation period. The total amount of sulfuric acid added was about 10% in excess of the theoretical quantity based on the 2-mercaptobenzothiazole. Thus, the final slurry was slightly acid. At this point the mineral oil (equivalent to 2% of the weight of disulfide present) was added and the mix was agitated for 15 minutes. The dibenzothiazyl disulfide was then recovered from the slurry on an Oliver filter and the washed, dewatered cake was dried at 90° C. It was then pulverized and sifted.

In the foregoing example, the mineral oil used was a rubber process oil, a medium grade of mineral oil or lubricating oil which had a specific gravity at 15½° C. of 0.915–0.940, a Saybolt viscosity at 100° C. of 40–45 seconds and a flash point (open cup) above 165° C. This material is one of the preferred materials of the invention, being outstanding among the large group of oily materials which may be used in the invention. Cottonseed oil is also a preferred material.

The following table lists representative results obtained by the practice of the present invention using di(benzothiazyl) disulfide coated with various oily materials and compounding the same with rubber both on a rubber mill and in a Banbury.

| Coating | Mill result | Banbury result |
| --- | --- | --- |
| None (blank) | Fair | Very poor. |
| Refined mineral oil (USP) | Good | Fair. |
| Cottonseed oil | do | Good. |
| Medium mineral oil (used in example) | do | Very good. |
| Stearic acid | do | Fair. |
| Paraffin | do | Fair—good. |
| Oleic acid | do | Fair. |

The above results of the milling and the Banbury tests were rated according to the degree of success obtained in breaking down the aggregates of the di(benzothiazyl) disulfide and obtaining a uniform dispersion of the ultimate particles of the same throughout the rubber. It will be observed that the treatments consistently showed marked improvement which in every case made the di(benzothiazyl) disulfide suitable for use on the mill and showed a general improvement in Banbury mixing with satisfactory results by the use of certain species which, particularly for Banbury mixing, constitute preferred forms.

Although, in the description of the invention, special reference has been made to oxidation of the mercaptoarylenethiazole according to the processes of U. S. Patent 1,908,935 and U. S. Patent 2,119,131, the invention is applicable to any variations of these processes or similar processes in which the di(arylenethiazyl) disulfide is prepared by oxidizing the corresponding mercaptoarylenethiazole by means of nitrous acid or its equivalents whereby hard, difficultly disaggregatable aggregates of the di(arylenethiazyl) disulfide are formed.

Obviously, other di(arylenethiazyl) disulfides than the di(benzothiazyl) disulfide used in the specific examples may be employed in the invention, these compounds consisting a well defined and well recognized class of rubber accelerators.

Although only the preferred embodiments of the invention have been described in detail, it will be apparent to those skilled in the art that various modifications may be made in the invention without departing from the spirit of the invention or the scope of the appended claims.

What we claim is:

1. A method of compounding rubber with hard, difficultly dispersible aggregates of a di(arylenethiazyl) disulfide prepared by oxidizing a 2-mercaptoarylenethiazole by means of nitrous acid which comprises rendering said aggregates susceptible to disaggregation on mechanical working with rubber by treating them with an oily material and mechanically working the treated aggregates with rubber until the aggregates are reduced to the ultimate particles of the di(arylenethiazyl) disulfide and said ultimate particles are dispersed throughout the rubber.

2. A method of rendering aggregates of a di(arylene thiazyl) disulfide prepared by oxidizing a 2-mercaptoarylenethiazole by means of nitrous acid susceptible to disaggregation on mechanical working with rubber which comprises treating the said aggregates with a mineral oil.

3. A method of rendering aggregates of a di(arylene thiazyl) disulfide prepared by oxidizing a 2-mercaptoarylenethiazole by means of nitrous acid susceptible to disaggregation on mechanical working with rubber which comprises treating the said aggregates with a vegetable oil.

4. A method of compounding rubber with aggregates of a di(arylenethiazyl) disulfide prepared by oxidizing a 2-mercaptoarylene thiazole by means of nitrous acid which comprises coating said aggregates with a mineral oil and mechanically working the treated aggregates with rubber in an internal mixer.

5. A method of compounding rubber with aggregates of a di(arylenethiazyl) disulfide prepared by oxidizing a 2-mercaptoarylene thiazole by means of nitrous acid which comprises coating said aggregates with a vegetable oil and mechanically working the treated aggregates with rubber in an internal mixer.

6. As a new composition of matter, aggregates of a di(arylenethiazyl) disulfide prepared by oxidizing a 2-mercaptoarylene thiazole by means of nitrous acid, the said aggregates being coated with a mineral oil.

7. As a new composition of matter, aggregates of a di(arylenethiazyl) disulfide prepared by oxidizing a 2-mercaptoarylene thiazole by means of nitrous acid, the said aggregates being coated with a vegetable oil.

8. A method of dispersing di(benzothiazyl) disulfide in rubber which comprises taking aggregates of di(benzothiazyl) disulfide prepared by oxidizing 2-mercaptobenzothiazole by means of nitrous acid, coating the same with a mineral oil and mechanically working the coated aggregates with rubber until disaggregation occurs and the di(benzothiazyl) disulfide is dispersed throughout the rubber.

9. A method of dispersing di(benzothiazyl) disulfide in rubber which comprises taking aggregates of di(benzothiazyl) disulfide prepared by oxidizing 2-mercaptobenzothiazole by means of nitrous acid, coating the same with a vegetable oil and mechanically working the coated aggregates with rubber until disaggregation occurs and the di(benzothiazyl) disulfide is dispersed throughout the rubber.

10. A method of dispersing di(benzothiazyl) disulfide in rubber which comprises taking aggregates of di(benzothiazyl) disulfide prepared by oxidizing 2-mercaptobenzothiazole by means of nitrous acid, coating the same with cottonseed oil and mechanically working the coated aggregates with rubber until disaggregation occurs and the di(benzothiazyl) disulfide is dispersed throughout the rubber.

CLAUDE H. SMITH.
ALBERT J. GRACIA.